United States Patent [19]
Gjestrum

[11] Patent Number: 5,488,920
[45] Date of Patent: Feb. 6, 1996

[54] DEVICE FOR HANDLING OF CABLES ON SEISMIC VESSELS

[75] Inventor: Einar Gjestrum, Stavanger, Norway

[73] Assignee: Geco A. S., Stavanger, Norway

[21] Appl. No.: 182,144

[22] PCT Filed: Jul. 23, 1992

[86] PCT No.: PCT/NO92/00125

§ 371 Date: Jan. 14, 1994

§ 102(e) Date: Jan. 14, 1994

[87] PCT Pub. No.: WO93/02371

PCT Pub. Date: Feb. 4, 1993

[30] Foreign Application Priority Data

Jul. 25, 1991 [NO] Norway ................... 912918

[51] Int. Cl.6 ................... B63B 21/66
[52] U.S. Cl. ................... 114/244
[58] Field of Search ................... 114/242, 243, 114/244, 245; 367/15, 20, 106; 405/158, 165, 166, 167

[56] References Cited

U.S. PATENT DOCUMENTS 4,313,392  2/1982  Guenther et al. ............ 114/244
4,781,140  11/1988  Bell et al. ............ 114/245
4,798,156  1/1989  Langeland et al. ............ 114/242

FOREIGN PATENT DOCUMENTS 0245957  11/1987  European Pat. Off. ..
2185578  1/1974  France .

OTHER PUBLICATIONS

Patent Abstracts of Japan, vol. 9, No. 68, P344.

*Primary Examiner*—Jesus D. Sotelo
*Attorney, Agent, or Firm*—Jacobson, Price, Holman & Stern

[57] ABSTRACT

A device to facilitate the handling, maintenance and replacement of seismic equipment and seismic energy sources in the gun arrangement section, i.e. the gun array of seismic gun cables on seismic survey vessels, on the vessel's after deck (1) by which the gun cables are transferred, with the arrays stored on the deck hanging in suspension rails (6), wherein the cable is wound up on to a number of drums (3) and deployed or recovered from the water over a slip (4) at the after end of the ship. On the deck there are also winch drums (5) for streamer cables. The gun cable drums (3) are placed in a row alongside one another athwartships. Also provided is a row of parallel tracks (6), suspended on rails which can be moved in a crosswise direction. The ends of the rails or tracks (6) are equipped with devices whereby they can be connected to transfer tracks (7) on the slip (4). The gun arrays in their tracks (6) can be moved athwartships, thus providing more working space and allowing better use to be made of the area available on the after deck.

13 Claims, 2 Drawing Sheets

DEVICE FOR HANDLING OF CABLES ON SEISMIC VESSELS

BACKGROUND OF THE INVENTION

The invention concerns a device for handling of cables on seismic vessels on the vessel's after deck, especially the gun arrangement sections, i.e. the gun arrays of gun cables, whereby several gun cables are transferred and stored on the deck, hanging on suspension rails, while the inner section of the cables is wound on to winding drums, where a slip is arranged for deployment/recovery of the cables into/out of the water and where in addition there are normally winch drums for streamer cables on the deck.

The gun arrangement section of the gun cable is usually called a gun array. This term will be used in the following to describe the gun cable's gun arrangement section.

At the present time most seismic surveys at sea are conducted using specially built ships whose after decks are designed for storing and handling the seismic gun cables and detection cables or streamer cables, which constitute the means whereby the seismic surveys are performed. The gun array comprises groups of seismic energy sources which transmit pulses into the water, the reflections from these being intercepted by the detection cables or streamer cables which transmit the signals back to the vessel for processing. Developments in survey methods in recent years have led to the situation where behind the vessel there are now towed a number of gun cables with gun arrays in parallel alongside one another, and several streamer cables are also used for the reception of the reflection signals. The design and construction of the individual elements have also been under constant development in order to improve the signal quality and to increase the vessel's productivity. This development has led to an increase in the amount of equipment, resulting in major problems on board the seismic vessels where, due to the dimensions of this equipment, the available space has become progressively smaller. There is a constant need for maintenance work on the gun arrays, and in addition the gun arrays often have to be reconstructed. There is therefore a great need for improvement in the handling routines and above all in the storage and working facilities on board the vessel.

BRIEF SUMMARY OF THE INVENTION

The object of the present invention is to provide a solution to these problems.

This object is achieved by the invention with a device of the type mentioned in the introduction, which is characterized by the features in the claims presented.

A natural solution to lack of space on the after deck of a vessel would be to increase the size of the deck and, e.g., to use wider vessels. However, this would be most disadvantageous since the vessel's total dimensions would thereby be increased disproportionally, substantially greater operating expenses would be incurred and the cost of building such ships would also be significantly greater. An extension of the ship's length will not entail any improvement since the cables have to be deployed into the water from the stern area. Another major problem has been the positioning of the winch drums for the streamer cables, which have traditionally been placed right at the after-end of the deck. These have occupied a disproportionate amount of space athwartships, thus making it difficult to move the gun cable past them and leading to a limit on the number of cables for which there was room. At the same time this arrangement has resulted in large areas of dead space behind the streamer drum, space which it has been possible to use as stowage space, but which has not been able to be used for handling of cables and maintenance work. In order to make the best-possible use of the space, a partial solution has been to guide the gun arrays in tracks which are arranged between the streamer drum and the ship's sides, a procedure which has led to the equipment in the deployment/recovery area right at the after end being packed tightly together. One alternative has also been to move the streamer drum to another deck, but this has not been a suitable solution either.

The invention overcomes the above problems by providing a device on a work and after deck of a seismic vessel for handling seismic gun cables, especially gun arrangement sections, i.e. gun arrays and gun cables, several gun cables being transferred and stored on the deck by hanging in suspension rails and wound on winding drums, where there is arranged a slip for deployment/recovery of the cables into/out of the water and where in addition there are normally winch drums for streamer cables on the deck, characterized in that the cable drums are placed alongside one another in a row athwartships, that the gun arrays are guided in a row of parallel tracks and suspended in rails which can be moved in a crosswise direction, and that the ends of the rails are equipped with devices for connecting the rail tracks to transfer tracks on the slip for deployment and recovery of the gun cables.

With the device in accordance with the invention the applicant has succeeded in providing the opportunity for a considerably more rational handling of the equipment. This is achieved by simple means and results in the possibility of using the whole area available on the after deck to a much greater extent than previously. Thereby the gun arrays in particular can be positioned in such a way that maintenance work and replacement can be carried out without any trouble and the gun arrays can also be positioned to give a clear space around the gun array(s) on which work is being done, so as to give a substantial improvement in the working conditions. At the same time it succeeds in maintaining the streamer drums in a favorable position so that the streamer can be deployed just as easily as before.

The device in accordance with the invention even makes it possible for narrower ships than before to be used, despite having more space available on the after deck. The design according to the invention is clearly significant not only with regard to the ship's propulsion in the water, but also because it will be easier to maintain a large open space on the after deck which offers the opportunity of using the device in accordance with the invention.

BRIEF DESCRIPTION OF THE DRAWINGS

The invention will now be described in more detail with reference to the accompanying drawings of two embodiments wherein.

DETAILED DESCRIPTION

Figure 1:
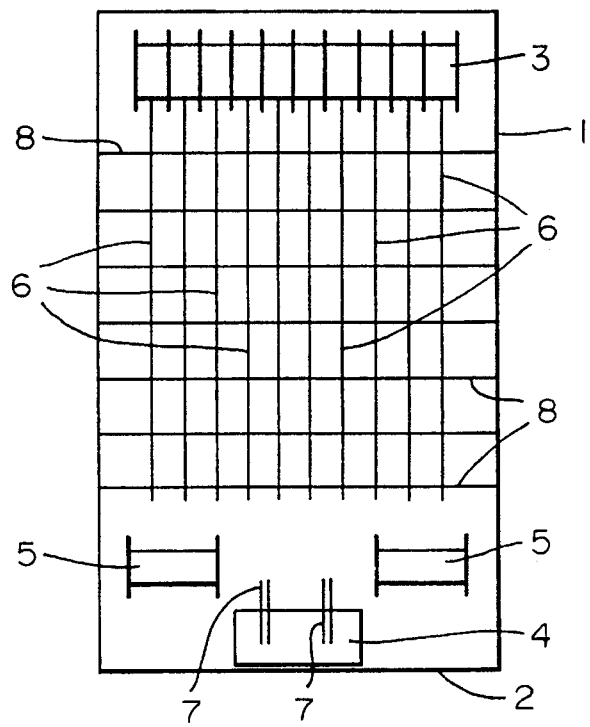
FIG. 1 is a schematic top plan view of a first embodiment of the device according to the invention on the after deck of a seismic vessel.

In the embodiments illustrated in the drawing only the special principles of the design of the invention are illustrated, with no consideration being given to the ship's design, the actual shape of the after deck, the shape of the drums or the suspension and the design of the various tracks, etc. All these details consist of design features and elements which either have been used before on seismic ships or will be known to a person skilled in the art and can be found used in other connections. Thus, e.g., the gun cable drum is of the type which is used on seismic ships to-day, as are the streamer cable drums and the deployment/recovery slip at the after end of the ship. In the same way the guide rails and storage of gun cables will include known elements from seismic vessels, but here modified in order to achieve the device according to the invention.

The ship's after deck is indicated by 1 and in both principal sketches is illustrated as a square surface area. The after deck creates a closed space and is covered by a deck above it, while it is open at the after end of the ship at 2. In this area the cables are deployed and recovered. The gun cables are wound on to a number of drums 3 which are placed alongside one another across ships or athwartships. In the device according to the invention these drums are placed symmetrically in a group on the innermost part of the deck. Thus, space is provided for a maximum number of cable drums with winch,.enabling a maximum number of cables to be kept and stored. Previously cable drums on vessels were usually placed in two or more groups.

The deployment/recovery of the cables takes place at the after end of the ship over a so-called slip which is indicated by 4. The slip can be of any type, and is in principle only a guide for the cable. On this slip the cables together with the equipment installed on them are guided into the water, or on to the deck, in a controlled manner. In the invention two transfer tracks or rails 7 are placed over the slip and as a part of it in order to guide the cables to the correct passage at the transition to the water. In the embodiment shown the slip 4 is placed symmetrically in relation to the cable drums 3, i.e. in the middle of the after end of the deck. On each side of the slip 4 a winch drum 5 is arranged for the detector cables or streamers. In the case of normal seismic surveys two streamers will be sufficient, but for extremely wide surveys and in certain constellations, e.g. when several ships are used, more streamers may be required in the water. These will then be installed on a deck higher up, even though this is not completely satisfactory. This will still be a solution for special cases.

Figure 2:
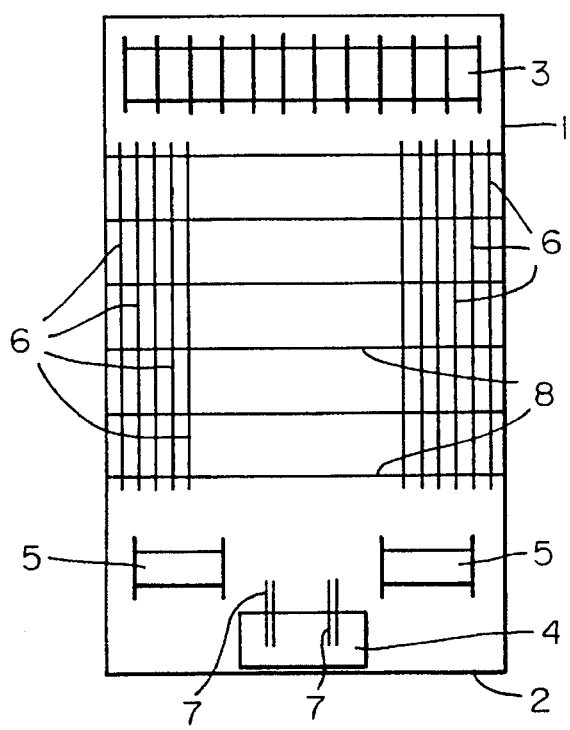
FIG. 2 is an alternative embodiment to the device of FIG. 1.
Figure 3:
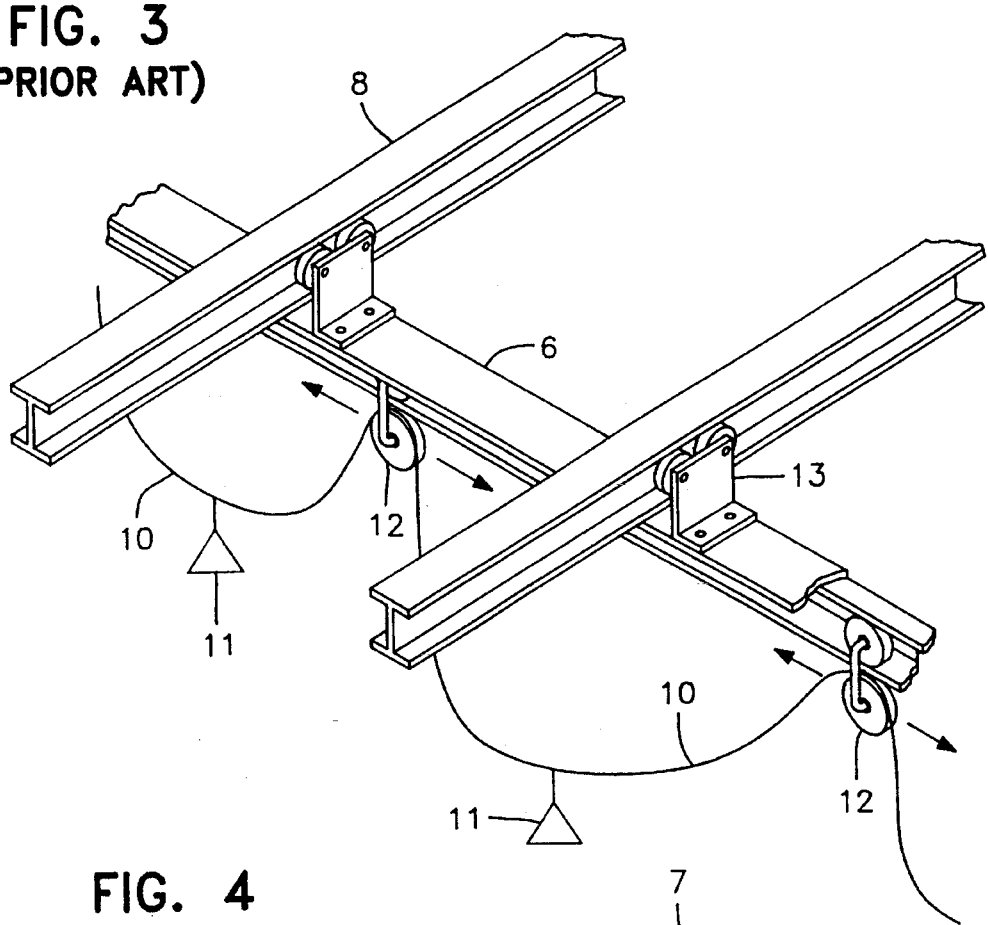
FIG. 3 is a schematic perspective view of a conventional known arrangement of support rails and movable rails supported on the support rails.
Figure 4:
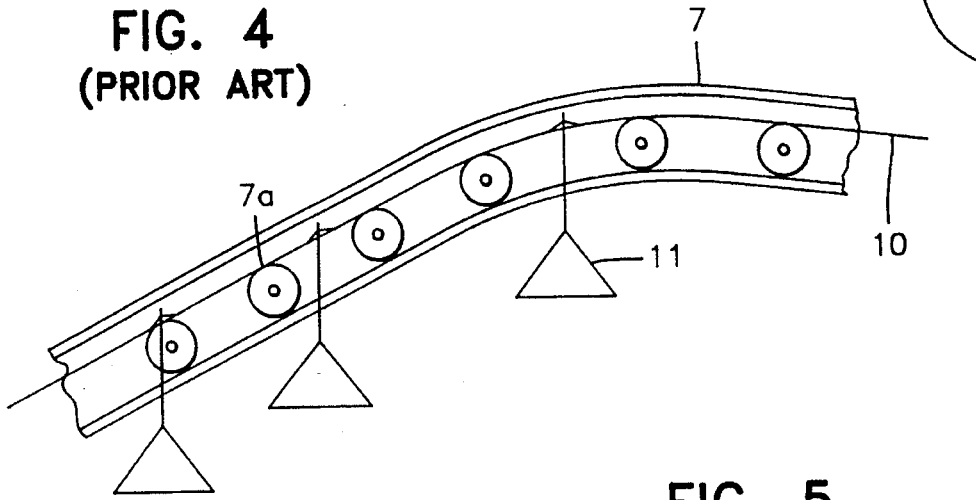
FIG. 4 is a schematic elevational view of a part of a transfer track for deploying and recovering seismic gun cables.

The gun cables 10 from the drums 3 with guns 11 suspended thereon in an array are stored in the deck's longitudinal direction, the cables and gun arrays in the area between the slip 4 and the drums 3 being suspended in suitable securing devices, preferably in rails in the roof over the deck. The cable itself is stored on the drums while the array section remains in the area. Conventional rail types such as those used at present and shown in FIG. 3 can be used here or rail sections can be used which form a kind of attachment lug with pulley 12 which keeps the gun cables in position in parallel tracks 6 as illustrated in the drawing. Thus from every drum 3 there will be a rail or track 6 on which the guns 11 with their respective cable 10 are stored ready for deployment. In the invention these parallel tracks are not, as in prior art, only arranged in those areas which are free at the after end and which are not blocked by the streamer drums 5, i.e. in the invention the entire available area has been used, including the area behind the streamer drums 5, so that all tracks 6 can be arranged in parallel. Thus a correct deployment from the drums 3 is achieved as well as the best possible and equal spacing between the gun arrays over their entire length on deck. This positioning also makes it possible to suspend the attachment devices or rails on the moving element which is placed across the deck or athwartships, since a number of such parallel moving devices are arranged on the roof. These are then connected with the tracks 6, thus allowing these to be moved in parallel athwartships, i.e. across the deck. This movement will be possible regardless of how the suspension devices are constructed, either as attachments in the form of trolleys on crosswise rails 8 or as rails 6 which are supported by trolleys 13 for movement in parallel on several of the crosswise rails 8. In the drawing the crosswise rails or tracks, 8 are illustrated in FIGS. 1 and 2 purely schematically as lines, since the technical design should be obvious to a person skilled in the art. With such an embodiment all the guns which are suspended on the gun cables in the middle of the deck will be equally accessible, thus allowing necessary work to be performed and giving a complete overall view of all the equipment.

Figure 5:
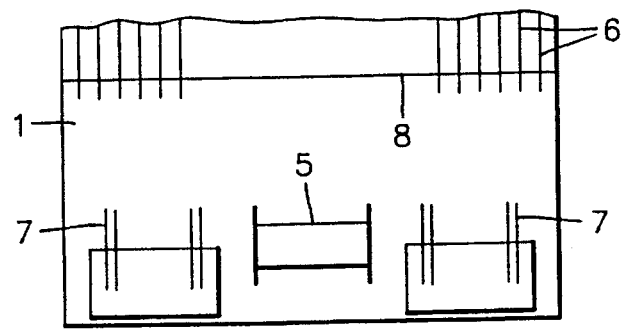
FIG. 5 is a partial schematic view similar to FIG. 2 showing a modification thereof.

When the gun cables 10 with their respective gun array 11—11 have to be placed in the water or pulled out, a connection is necessary to transfer the cables from rails 6 to the slip's transfer tracks 7. For this purpose there have been placed in the area between the ends of the parallel rails 6 and the tracks 7 such as shown in FIG. 5 for example, transfer devices which guide the cable in a curved track to the transfer track. When a cable is deployed, therefore, this transfer device just has to be "switched" over to the cable which has to be deployed.

The embodiment illustrated in FIG. 2 corresponds in principle to that illustrated in FIG. 1 and the same reference numbers indicate the same parts. The difference between the two embodiments is that in the embodiment in FIG. 2 a solution has been chosen in which the suspended gun cables with respective gun arrays on their tracks 6 can be moved to the maximum extent out to one or both sides of the ship, thus making available a large open space in the middle behind the slip 4, where the necessary work can be carried out. The transition from the tracks 6 to the drums 3 causes no problems, since the cables and the gun arrays are flexible. Here it is possible to pull forward the array or arrays on which work requires to be done and thereby be able to work under the most favorable working conditions possible. When the cables and gun arrays are deployed these can be pulled forward in turn until they are in line with the transfer rails 7, whereupon the rails are connected together and the cables guided out over the slip. This embodiment thus provides an extremely easy transition to the deployment/recovery system.

It should be obvious that a number of modifications would be possible within the scope of the invention. Variants could be employed containing elements from both the embodiment in FIG. 1 and in FIG. 2, and there are also a great number of variations possible in the suspension system, transition arrangements between the various track parts, etc. All such modifications are intended to fall within the scope of the invention. When using the device according to the invention it will be necessary for the deck surface 1 to be entirely free of supports, pillars, etc. since the cables should be able to be moved athwartships. This possibility is offered and also facilitated due to the fact that the device according to the invention enables narrower ships than before to be used. In the embodiment in FIG. 1 no special instructions are indicated regarding the moving of the tracks 6 athwartships, since the object here is to achieve the most uniform distribution possible of the cables with the gun arrays in the space available, thus making the best possible use of the space. It should, however, be obvious that the proposed suspension will naturally make the most of the opportunities for opening up space between the cables in the tracks 6 when this work is required to be done. Motor power, e.g. of an electrical or hydraulic nature, will preferably be used for moving the gun arrays on the tracks or rails 6, but it will also be possible to perform the moving procedure manually. Such an alternative will be particularly relevant in the embodiment in FIG. 1, where the tracks or rails 6 only have to be moved aside a little to give room to work, while for moving longer distances, as in FIG. 2, it can be advantageous to use motor power. In order to prevent accidental sliding it will, of course, be possible to lock all rails and movements so that no movement can take place due to heavy seas.

It should be noted that the design of the slip and the design and positioning of streamer drums do not constitute any part of the invention. It will be entirely possible to position the slip asymmetrically on one side or to have one slip on each side and guide the gun cables accordingly, even though the symmetrical arrangement is preferred. The streamer drums can be positioned accordingly and it may also be possible to arrange, e.g. three streamer drums distributed symmetrically, with slips in the spaces between them.

The arrangement according to the invention will be advantageous even if no streamer drums are placed on the work deck.

I claim:

1. In a device on a work and after deck of a seismic vessel for handling cables having seismic gun arrangement sections, including gun arrays and gun cables, said gun cables being transferred and stored on the deck of the vessel, suspension rails on which said gun cables are supported, winding drums on which said gun cables are wound, a slip for deployment and recovery of said gun cables into and out of the water, and winch drums for streamer cables on said deck, the improvement comprising:

a plurality of cable-winding drums disposed alongside each other for rotation on parallel axes extending in a transverse direction athwartships;

a plurality of transverse support rails mounted on said vessel in said transverse direction in spaced relationship;

gun cable support means movably mounted on said transverse rails for supporting and guiding said gun cables in a plurality of parallel tracks movable in said transverse direction;

transfer tracks mounted on said slip for transferring said gun cables and gun arrays thereon during said deployment and recovery of said cables into and out of the water; and ends on said gun cable support means adjacent said transfer tracks.

2. The device as claimed in claim 1 wherein:

said gun cable support means comprises support rails for said gun cables movably mounted for displacement transversely toward both sides of said vessel.

3. The device as claimed in claim 2 wherein:

said gun cable support rails are transversely movable separately.

4. The device as claimed in claim 1 wherein:

said gun cable support means comprises gun cable support rails in parallel spaced relationship in said transverse direction athwartships.

5. The device as claimed in claim 4 wherein:

said gun cable support means further comprises load-carrying elements movably mounted on said gun cable support rails for guiding said gun cables, and means for leading said elements onto said transverse support rails.

6. The device as claimed in claim 1 wherein:

said transfer tracks comprise at least two separate transfer tracks in relative spaced relationship in said transverse direction.

7. The device as claimed in claim 6 wherein:

said slip is disposed at the after end of said vessel.

8. The device as claimed in claim 1 wherein:

said streamer cable winch drums are disposed in relative spaced relationship with respect to each other in said transverse direction to provide a central area therebetween; and said slip is disposed in said central area relative to said streamer cable winch drums.

9. The device as claimed in claim 8 wherein:

said slip is disposed at the after end of said vessel.

10. The device as claimed in claim 1 wherein:

said streamer cable winch drums are disposed on each side of said slip in said transverse direction.

11. The device as claimed in claim 1 wherein:

a separate slip is provided adjacent each side of said after deck to provide a space therebetween, and at least one streamer cable winch drum is disposed in said space between said slips.

12. The device as claimed in claim 11 wherein:

said slips are disposed at the after end of said vessel.

13. The device as claimed in claim 1 wherein:

said slip is disposed at the after end of said vessel.

* * * * *